US010050820B2

(12) United States Patent
Hong et al.

(10) Patent No.: US 10,050,820 B2
(45) Date of Patent: Aug. 14, 2018

(54) APPARATUS AND METHOD FOR MODULATION/DEMODULATION FOR TRANSMITTING AND RECEIVING SIGNAL IN WIRELESS COMMUNICATION SYSTEM

(71) Applicant: Samsung Electronics Co., Ltd, Gyeonggi-do (KR)

(72) Inventors: Sung-Nam Hong, Gyeonggi-do (KR); Woo-Myoung Park, Gyeonggi-do (KR); Min Sagong, Gyeonggi-do (KR); Seok-Ki Ahn, Gyeonggi-do (KR); Chi-Woo Lim, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/510,671

(22) PCT Filed: Sep. 9, 2015

(86) PCT No.: PCT/KR2015/009481
§ 371 (c)(1),
(2) Date: Mar. 10, 2017

(87) PCT Pub. No.: WO2016/039562
PCT Pub. Date: Mar. 17, 2016

(65) Prior Publication Data
US 2017/0324605 A1 Nov. 9, 2017

(30) Foreign Application Priority Data

Sep. 12, 2014 (KR) ........................ 10-2014-0121144

(51) Int. Cl.
*H04L 27/36* (2006.01)
*H04L 27/34* (2006.01)
*H04L 27/38* (2006.01)

(52) U.S. Cl.
CPC ........ *H04L 27/363* (2013.01); *H04L 27/3494* (2013.01); *H04L 27/38* (2013.01)

(58) Field of Classification Search
CPC .... H04L 27/363; H04L 27/38; H04L 27/3494
See application file for complete search history.

(56) References Cited

U.S. PATENT DOCUMENTS

| 7,733,939 B2 * | 6/2010 | Trachewsky | ............ H04J 13/00 |
| | | | 375/130 |
| 9,083,444 B2 * | 7/2015 | Schaffner | ................. H04B 1/69 |

(Continued)

FOREIGN PATENT DOCUMENTS

| KR | 1020150101837 A | 9/2015 |
| KR | 1020150102488 A | 9/2015 |

(Continued)

OTHER PUBLICATIONS

International Search Report dated Dec. 23, 2015 in connection with International Application No. PCT/KR2015/009481, 7 pages.

(Continued)

*Primary Examiner* — Kenneth Lam

(57) ABSTRACT

A method for modulation in a transmitter for transmitting a signal in a wireless communication system according to an embodiment of the present invention comprises: a step for determining a modulation scheme; a step for, if the determined modulation scheme corresponds to a specific modulation scheme, converting encoded information bits to quadrature amplitude modulation (QAM) symbols in accordance with a predetermined QAM modulation order, selecting a sequence corresponding to an element of an integer vector in a predetermined sequence set, repeating the converted QAM symbols for a predetermined sequence length, and outputting signals by multiplying the repeated QAM (Continued)

symbols and the selected sequence; and a step for transmitting the outputted signals to a receiver.

30 Claims, 15 Drawing Sheets

(56) References Cited

U.S. PATENT DOCUMENTS

| | | | |
|---|---|---|---|
| 2010/0238984 A1* | 9/2010 | Sayana | H04B 7/0634 |
| | | | 375/219 |
| 2012/0027004 A1 | 2/2012 | Ko et al. | |
| 2012/0155415 A1 | 6/2012 | Seok | |
| 2013/0308657 A1 | 11/2013 | Lee et al. | |
| 2014/0029681 A1* | 1/2014 | Zhang | H04L 1/0046 |
| | | | 375/260 |
| 2014/0044009 A1* | 2/2014 | Piesinger | H04W 56/001 |
| | | | 370/254 |
| 2015/0043470 A1 | 2/2015 | Hwang et al. | |
| 2015/0358194 A1 | 12/2015 | Yu et al. | |
| 2016/0366004 A1 | 12/2016 | Hong et al. | |
| 2016/0366006 A1 | 12/2016 | Hong et al. | |

FOREIGN PATENT DOCUMENTS

| | | |
|---|---|---|
| WO | 2011025178 A2 | 3/2011 |
| WO | 2013137682 A1 | 9/2013 |
| WO | 2014098537 A1 | 6/2014 |

OTHER PUBLICATIONS

Written Opinion of the International Searching Authority dated Dec. 23, 2015 in connection with International Application No. PCT/KR2015/009481, 4 pages.

* cited by examiner

APPARATUS AND METHOD FOR MODULATION/DEMODULATION FOR TRANSMITTING AND RECEIVING SIGNAL IN WIRELESS COMMUNICATION SYSTEM

CROSS-REFERENCE TO RELATED APPLICATION(S)

The present application claims priority under 35 U.S.C. § 365 to International Patent Application No. PCT/KR2015/009481 filed Sep. 9, 2015, entitled "APPARATUS AND METHOD FOR MODULATION/DEMODULATION FOR TRANSMITTING AND RECEIVING SIGNAL IN WIRELESS COMMUNICATION SYSTEM", and, through International Patent Application No. PCT/KR2015/009481, to Korean Patent Application No. 10-2014-0121144 filed Sep. 12, 2014, each of which are incorporated herein by reference into the present disclosure as if fully set forth herein.

TECHNICAL FIELD

The present disclosure relates to a modulation/demodulation apparatus and method in which a distribution of an interference signal has a non-Gaussian distribution for signal transmission and reception in a wireless communication system.

BACKGROUND ART

To satisfy demands for wireless data traffic having increased since commercialization of $4^{th}$-Generation (4G) communication systems, efforts have been made to develop improved $5^{th}$-Generation (5G) communication systems or pre-5G communication systems. For this reason, the 5G communication system or the pre-5G communication system is also called a beyond-4G-network communication system or a post-long term evolution (LTE) system.

To achieve a high data rate, implementation of the 5G communication system in an ultra-high frequency (mm-Wave) band (e.g., a 60 GHz band) is under consideration. In the 5G communication system, beamforming, massive multi-input multi-output (MIMO), full dimensional MIMO (FD-MIMO), an array antenna, analog beamforming, and large-scale antenna technologies have been discussed to alleviate a propagation path loss and to increase a propagation distance in the ultra-high frequency band.

For system network improvement, in the 5G communication system, techniques such as an evolved small cell, an advanced small cell, a cloud radio access network (RAN), an ultra-dense network, a device to device (D2D) communication, a wireless backhaul, a moving network, cooperative communication, coordinated multi-points (CoMPs), and interference cancellation have been developed.

In the 5G system, advanced coding modulation (ACM) schemes including hybrid frequency-shift keying (FSK) and quadrature amplitude modulation (QAM) modulation (FQAM) and sliding window superposition coding (SWSC), and advanced access schemes including filter bank multi carrier (FBMC), non-orthogonal multiple access (NOMA), and sparse code multiple access (SCMA) have been developed.

In a wireless communication system, to operate a system with low complexity (for example, to operate adaptive modulation and encoding, to generate a soft decision decoding metric, etc.), a Gaussian assumption for an interference signal is used. To make characteristics of an interference signals as close as possible to a Gaussian distribution, a quadrature amplitude modulation (QAM)-based modulation scheme will be mainly used. In addition, for a user that may not satisfy target error performance even if a minimum channel encoding rate and a minimum modulation order are applied, a QAM symbol is repeatedly transmitted to achieve target performance.

However, it has recently proved that if a statistical distribution of an additive noise follows a Gaussian distribution in a wireless communication system where a strong interference signal exists, this case is worst in terms of a channel capacity. Thus, if a statistical distribution of interference signals having additive noise characteristics is designed to follow a non-Gaussian distribution, a higher system throughput than that of a conventional system is apparently obtained. A modulation scheme proposed for this reason is a frequency quadrature amplitude modulation (FQAM) scheme.

FIGS. 1 and 2 show characteristics of a FQAM scheme in a conventional wireless communication system.

Referring to FIG. 1, a FQAM scheme (c) is a hybrid modulation scheme that is a combination of a QAM scheme (a) and a frequency shift keying (FSK) (b), in which some of multiple subcarriers of a symbol are activated, such that a statistical distribution of an interference signal has characteristics of a non-Gaussian distribution. This is similar with a conventional FSK scheme. However, the FQAM scheme transmits a QAM symbol through activated subcarriers, thereby largely improving spectrum efficiency when compared to the FSK scheme. As shown in FIG. 2, if the FQAM scheme is applied to cell edge users having strong interference signals, a non-Gaussian interference channel is formed, thereby largely improving a conventional system throughput when compared to a system that forms a Gaussian interference channel by repeatedly transmitting a QAM symbol.

However, to obtain remarkable performance improvement when compared to a conventional technique by applying a modulation scheme such as the FQAM scheme, application of non-binary encoding/decoding is essential. This is because the FQAM scheme is more suitable for a non-binary code than a binary code due to characteristics of a distance between candidate transmission signals. However, a non-binary encoding/decoding technique, which is essential for application of the FQAM scheme, is highly complex, causing a problem in implementation. A modulation scheme proposed to solve the problem in implementation is a nulling quadrature amplitude modulation (NQAM) scheme. The NQAM scheme is a scheme that increases a transmission power of a symbol modulated using a QAM scheme, let some subcarriers be empty, and applies a subcarrier permutation rule specific to each cell. The NQAM scheme forms a non-Gaussian interference channel which is similar with for the FQAM scheme, unlike conventional repeated transmission of a QAM symbol. The NQAM scheme is a binary encoding/decoding technique unlike conventional FQAM, and may largely improve performance in comparison to an existing QAM scheme.

Meanwhile, in a cellular wireless communication system, there are a downlink through which a base station delivers information to a terminal and an uplink through which the terminal delivers information to the base station. The uplink through which the terminal delivers information to the base station needs to minimize battery consumption of the terminal, such that a peak to average power ratio (PAPR) problem is regarded as being important. Thus, in a standard related to a cellular wireless communication system, a single carrier frequency division multiple access (SC-FDMA) scheme is applied to the uplink to reduce the PAPR.

The FQAM scheme and the NQAM scheme, when applied to an orthogonal frequency-division multiple access (OFDMA), have a PAPR that is similar with the QAM scheme, but have a much higher PAPR than the QAM scheme when applied to the SC-FDMA scheme. This is because the FQAM scheme and the NQAM scheme activate only some of multiple subcarriers of a symbol. If the FQAM scheme or the NQAM scheme is applied to the SC-FDMA system in place of the QAM scheme, a non-Gaussian interference channel is formed, but a transmission power needs to be reduced in comparison to the QAM scheme due to the PAPR problem, largely degrading overall network throughput improvement.

A modulation scheme proposed to solve this problem is a sequence quadrature amplitude modulation (SQAM) scheme. The SQAM scheme removes empty subcarriers of the FQAM scheme by applying sequence modulation instead of the FSK scheme of the FQAM scheme, and adds a correlator for a received signal to a receiver, causing an interference signal observed in the receiver to have a non-Gaussian distribution that is similar with for the FQAM scheme. Thus, by forming a non-Gaussian interference channel while maintaining PAPR characteristics of the SQAM scheme similarly with the QAM scheme, performance has been largely improved in comparison to the existing QAM scheme. However, to improve performance when compared to the existing QAM scheme by applying the SQAM scheme, application of a non-binary encoding/decoding technique is essentially needed. For this reason, in a system using the SQAM scheme, a problem in implementation is very likely to occur due to the complexity of the non-binary encoding/decoding. Therefore, there is a need for a modulation scheme capable of forming a non-Gaussian interference channel without causing the PAPR problem, and improving performance with a binary encoding/decoding technique in comparison to a conventional QAM scheme, in an SC-FDMA system.

DETAILED DESCRIPTION OF THE INVENTION

Technical Problem

The present disclosure provides a modulation/demodulation apparatus and method for generating a non-Gaussian interference channel in signal transmission and reception in a wireless communication system.

The present disclosure also provides a modulation/demodulation apparatus and method for applying a binary encoding/decoding technique in a non-Gaussian interference channel in signal transmission and reception in a wireless communication system.

The present disclosure also provides a modulation/demodulation apparatus and method that does not cause a PAPR problem in signal transmission and reception in a wireless communication system.

Technical Solution

A modulation method in a transmitter that transmits a signal in a wireless communication system according to an embodiment of the present disclosure includes determining a modulation scheme, converting encoded information bits to quadrature amplitude modulation (QAM) symbols according to a predetermined QAM modulation order if the determined modulation scheme corresponds to a particular modulation scheme, selecting a sequence corresponding to an element of an integer vector in a predetermined sequence set, repeating the converted QAM symbols for a predetermined sequence length, and outputting a signal by multiplying the repeated QAM symbols by the selected sequence, and transmitting the output signal to a receiver.

A demodulation method in a receiver that receives a signal in a wireless communication system according to an embodiment of the present disclosure includes receiving a signal from a transmitter, extracting sequence information corresponding to the received signal from a sequence set based on a correlation corresponding to the sequence set, predetermined in the transmitter, and demodulating the received signal based on the received signal and a log likelihood ratio (LLR) calculation result corresponding to the sequence information, in which the received signal is a signal obtained by converting the encoded information bits into QAM symbols according to a predetermined QAM modulation order, selecting a sequence corresponding to an element of an integer vector in a predetermined sequence set, repeating the converted QAM symbols for a predetermined sequence length, and outputting a signal by multiplying the repeated QAM symbols by the selected sequence.

A transmitter that modulates and transmits a signal in a wireless communication system according to an embodiment of the present disclosure includes a modulator configured to determine a modulation scheme, to convert encoded information bits to QAM symbols according to a predetermined QAM modulation order if the determined modulation scheme corresponds to a particular modulation scheme, to select a sequence corresponding to an element of an integer vector in a predetermined sequence set, to repeat the converted QAM symbols for a predetermined sequence length, and to output a signal by multiplying the repeated QAM symbols by the selected sequence, and a transmission unit configured to transmit the output signal to a receiver.

A receiver that receives and demodulates a signal in a wireless communication system according to an embodiment of the present disclosure includes a reception unit configured to receive a signal from a transmitter, a correlator configured to extract sequence information corresponding to the received signal from a sequence set based on a correlation corresponding to the sequence set, predetermined in the transmitter, and a demodulator configured to demodulate the received signal based on the received signal and an LLR calculation result corresponding to the sequence information, in which the received signal is a signal obtained by converting the encoded information bits into QAM symbols according to a predetermined QAM modulation order, selecting a sequence corresponding to an element of an integer vector in a predetermined sequence set, repeating the converted QAM symbols for a predetermined sequence length, and outputting a signal by multiplying the repeated QAM symbols by the selected sequence.

Advantageous Effects

The present disclosure applies a binary encoding and decoding technique in a non-Gaussian interference channel in signal transmission and reception in a wireless communication system. The present disclosure also improves a channel capacity by making an interference signal non-Gaussian in signal transmission and reception in a wireless communication system. The present disclosure also does not cause a PAPR problem when applied to an SC-FDMA system unlike a conventional FQAM scheme or NQAM scheme.

Meanwhile, other various effects will be directly or implicitly disclosed in the following detailed description of embodiments of the present disclosure.

MODE FOR CARRYING OUT THE INVENTION

Hereinafter, exemplary embodiments of the present invention will be described in detail with reference to the accompanying drawings. In the following description, only parts necessary for understanding of operations according to embodiments of the present disclosure will be described and other parts will not be described not to obscure the subject matter of the present disclosure.

The main subject matter of the present disclosure provides a modulation/demodulation apparatus and method for applying a binary encoding/decoding technique in a non-Gaussian interference channel in signal transmission and reception in a wireless communication system.

Figure 1:
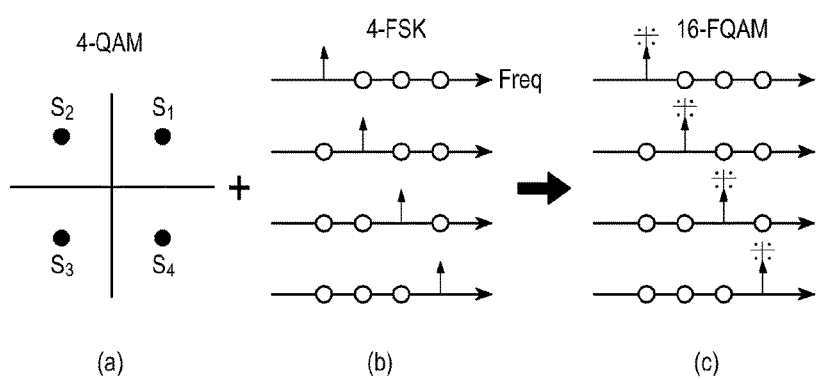
FIGS. 1 and 2 show characteristics of a FQAM scheme in a conventional wireless communication system.
Figure 2:
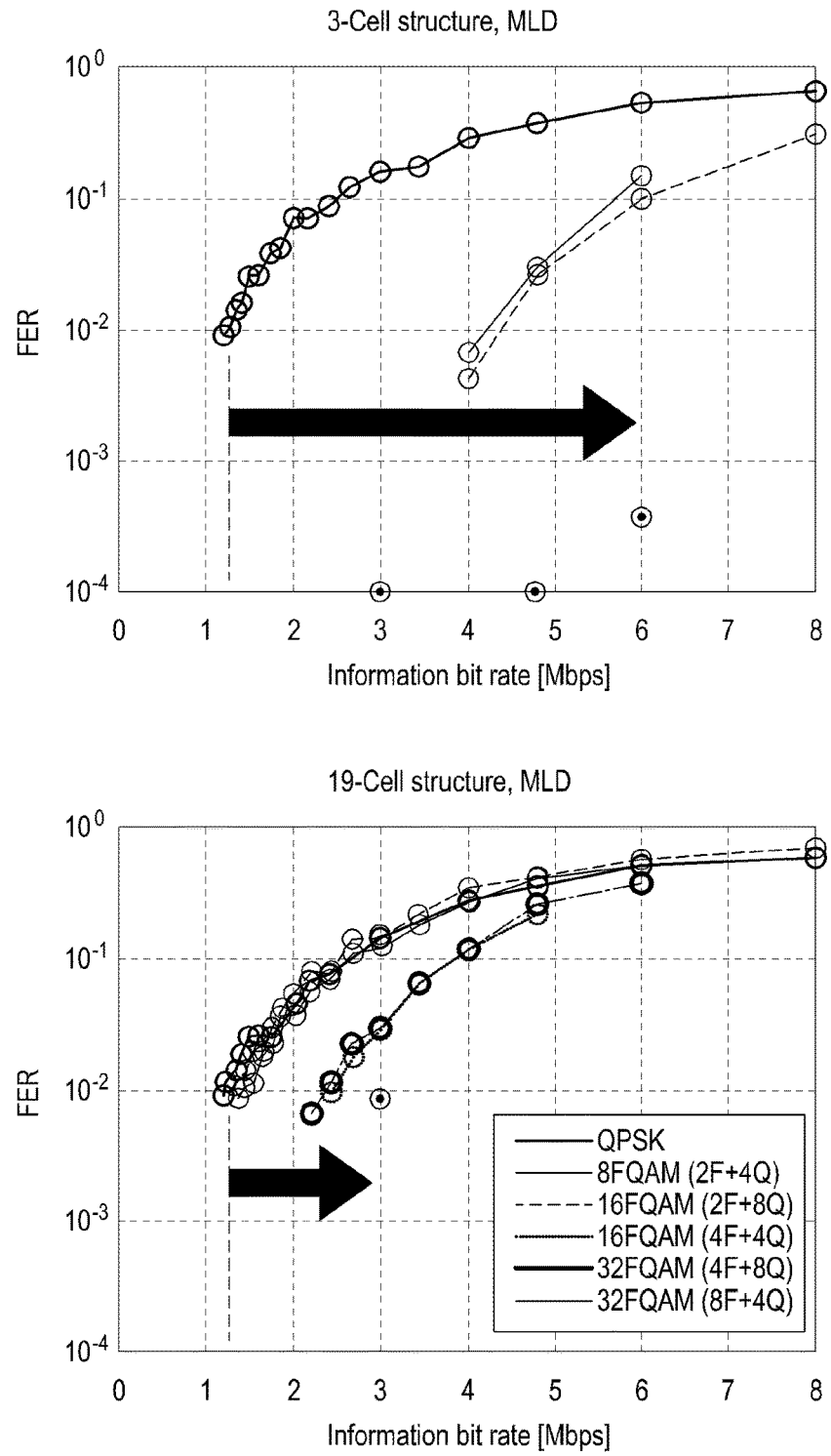
Figure 3:
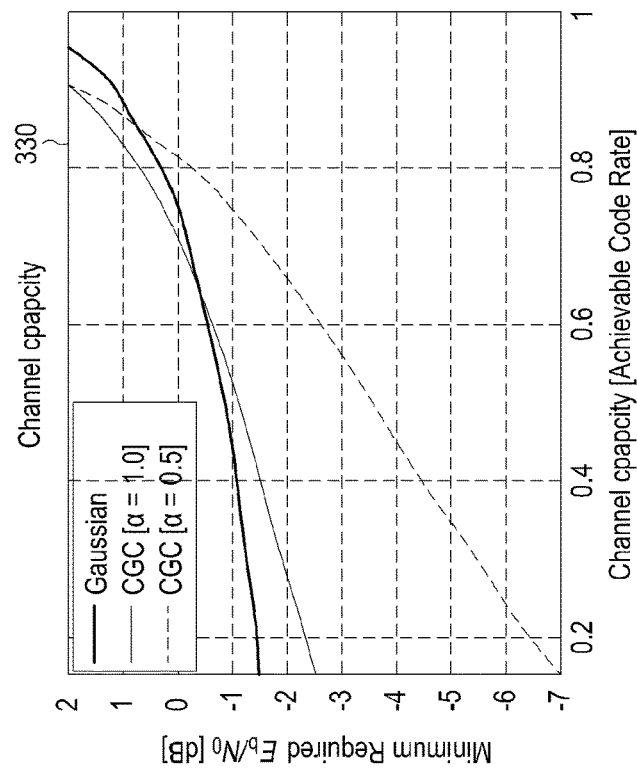
FIG. 3 shows a change in a channel transmission capacity with respect to non-Gaussian distribution characteristics of an additive noise.
Figure 3:
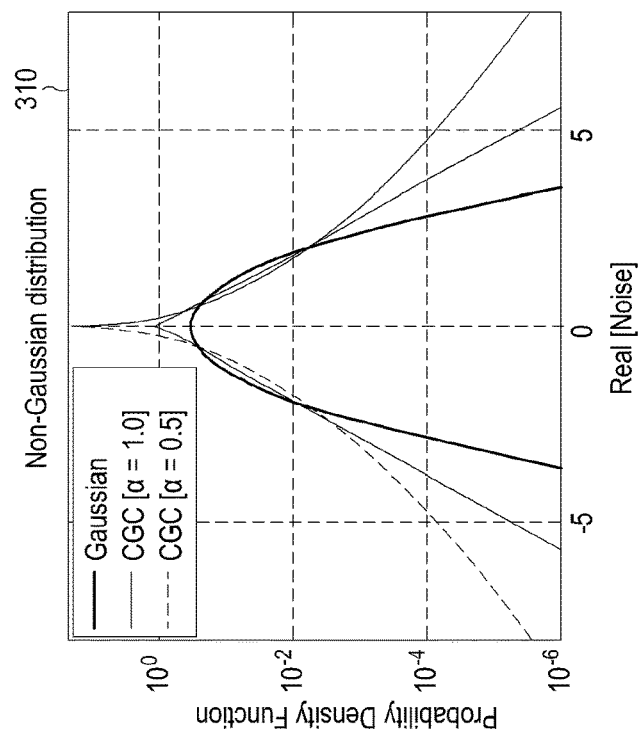

FIG. 3 shows a change in a channel transmission capacity with respect to non-Gaussian distribution characteristics of an additive noise.

Referring to FIG. 3, reference numeral 310 indicates an additive noise distribution which is complex generalized Gaussian having a Gaussian of 1.0 and an alpha value ($\alpha$) of 0.5, and reference numeral 330 indicates a minimum signal-to-noise ratio required with respect to a channel capacity in each case.

From reference 310 and reference 330, it can be seen that if an additive noise distribution is a Gaussian distribution in an environment where an interference signal has a strong strength, a channel capacity is lower than for an additive noise distribution corresponding to other distributions. In addition, if an additive noise distribution is a Gaussian distribution and has a high peak/heavy tail distribution, a channel capacity increases.

As such, if a statistical distribution of an additive noise follows a Gaussian distribution in a wireless communication system, a channel capacity is lower than for other distributions. Thus, if a wireless communication system is designed such that a statistical distribution of interference signals having characteristics of an additive noise follows a non-Gaussian distribution, a higher system throughput may be obtained by improvement of a channel capacity.

To this end, a detailed description will be made of a modulation apparatus and method for signal transmission and reception in a wireless communication system where a statistical distribution of interference signals follows a non-Gaussian distribution according to an embodiment of the present disclosure.

Figure 4:
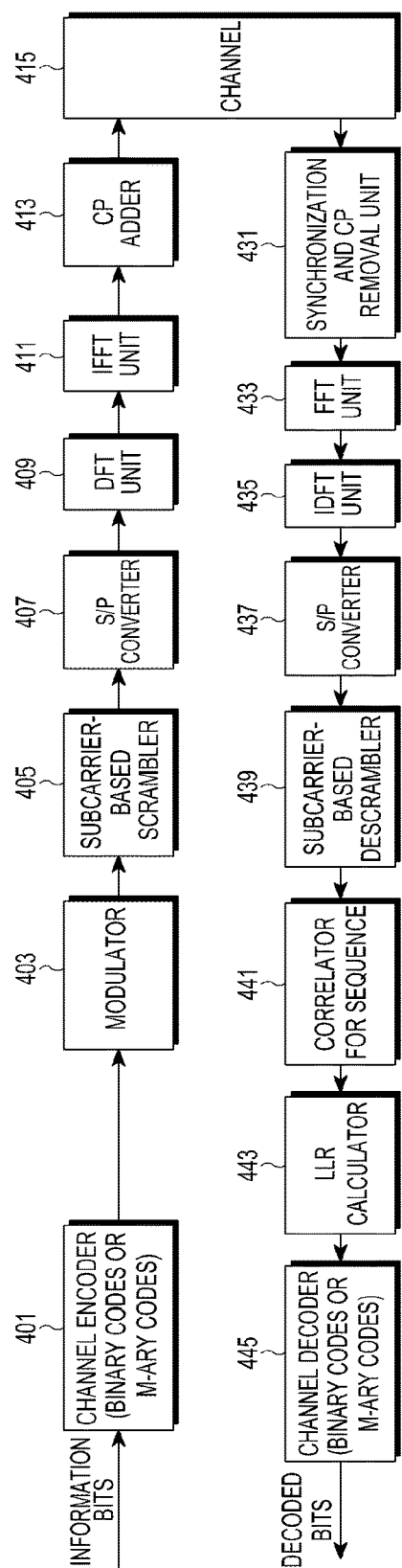
FIG. 4 is a block diagram of a modulation and demodulation apparatus for transmitting and receiving a signal in a wireless communication system according to an embodiment of the present disclosure.

FIG. 4 is a block diagram of a modulation and demodulation apparatus for transmitting and receiving a signal in a wireless communication system according to an embodiment of the present disclosure.

Referring to FIG. 4, a modulation apparatus for transmitting a signal (hereinafter, referred to as a transmitter) may include at least one of a channel encoder 401, a modulator 403, a scrambler 405, a serial/parallel (S/P) converter 407, a discrete Fourier transform (DFT) unit 409, an inverse fast Fourier transform (IFFT) unit 411, and a cyclic prefix (CP) adder 413. Elements included in the transmitter may not include only essential elements and some of them may be omitted according to an embodiment. In particular, the modulator 403 and the scrambler 405 perform main operations according to an embodiment of the present disclosure. The following description will be made on the assumption that the channel encoder 401 and the modulator 403 use a hopped QAM (HQAM) scheme.

The channel encoder 401 encodes transmission information bits by using a binary code or a non-binary code. In particular, the HQAM scheme is similar with the QAM scheme in terms of information transmission and reception, and thus the channel encoder 401 according to an embodiment of the present disclosure encodes transmission information bits by using a binary code.

The modulator 403 modulates the encoded information bits by using the HQAM scheme. A level of the HQAM scheme used in this case may be determined differently according to an embodiment, and the level may be determined variably according to a channel state. In particular, the modulator 403 according to an embodiment of the present disclosure may operate as described below.

According to an embodiment of the present disclosure, before the modulator 403 performs modulation, the transmitter receives a QAM modulation order and sequence length information to be applied from a receiver. The transmitter sets a receiver (i.e., base station)-specific integer vector (V) for each receiver. Herein, each element of the integer vector means a sequence index of a specific sequence set. The integer vector is a random sequence that is directly generated by the transmitter or is received from the receiver, and is set based on at least one of a cell identifier (ID) (or a sector ID) and a transmitter (i.e., terminal) ID. The integer vector may be set to minimize a hit probability between neighbor cells that are highly likely to be high dominant interferers, while maintaining characteristics of the random sequence.

For example, if V1, V2, V3, and V4 are neighbor cells, an integer vector of each cell may be configured as shown in Table 1.

TABLE 1

Desired cell: V1 = [1 1 2 4 2 1 . . . ]
Interfering cell: V2 = [2 3 1 2 1 4 . . . ]
Interfering cell: V3 = [4 2 3 1 4 2 . . . ]
Interfering cell: V4 = [3 4 4 3 3 3 . . . ]

The specific sequence set satisfies a sequence length delivered by the receiver. For example, the sequence set may be configured as shown in Table 2.

TABLE 2

S1 = [1 1 1 1]
S2 = [1 −1 1 −1]
S3 = [1 1 −1 −1]
S4 = [1 −1 −1 1]

The sequence set is configured as shown in Table 2, and if the first element V(1) of the V vector is 1 for V=[1 3 2 2 4], it means S1=[1 1 1 1], and if the second element V(2) of the V vector is 3, it means S3=[1 1 −1 −1], and if the third element V(3) of the V vector is 2, it means S2=[1 −1 1 −1].

Figure 5:
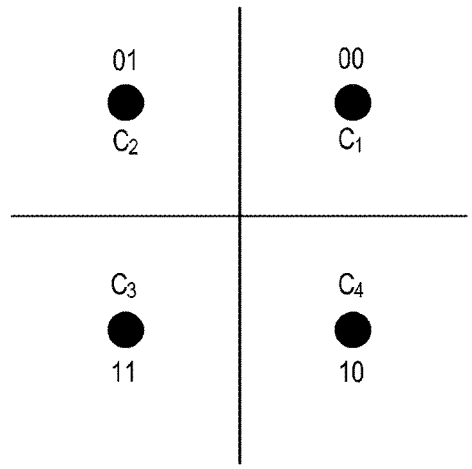
FIG. 5 illustrates a symbol mapping according to QPSK to which an embodiment of the present disclosure is applied.

For example, it is assumed that in basic modulation information, a QAM modulation order is QPSK, a sequence length is 4, V=[1 3 2 2 4], and a sequence set as shown in Table 2 is used. If input information bits are 01 00 01 11 10, the transmitter performs symbol mapping according to QPSK and thus outputs C2 C1 C2 C3 C4 as shown in FIG. 5. The modulator 403 selects a sequence corresponding to an element of V from the sequence set of Table 2. That is, the modulator 403 selects S1=[1 1 1 1] for V(1), S3=[1 1 −1 −1] for V(2), S2=[1 −1 1 −1] for V(3), S2=[1 −1 1 −1] for V(4), and S4=[1 −1 −1 1] for V(5). Since the sequence length delivered in advance from the receiver is 4, the modulator 403 outputs C2 C2 C2 C2 C1 C1 C1 C1 C2 C2 C2 C2 C3 C3 C3 C3 C4 C4 C4 C4 by repeating a QAM symbol four times, and outputs [C2 C2 C2 C2] [C1 C1 −C1 −C1] [C2 −C2 C2 −C2] [C3 −C3 C3 −C3] [C4 −C4 −C4 C4] by multiplying the repeated QAM symbols by the selected sequence.

The scrambler 405 scrambles the output signal on the basis of or in the unit of a subcarrier. More specifically, since there may exist a repeated pattern of subcarriers due to a sequence applied according to the present disclosure, the scrambler 405 may apply scrambling in the unit of a subcarrier to reduce a pattern repeated for reducing a PAPR. A way for the scrambler 405 to select a scrambling sequence may be determined variously according to a transmission signal, but a scrambling sequence may be identically applied in identical transmitter and receiver and a scrambling sequence may be identically applied for each transmitter. The scrambler 405 is a unit for optimizing a PAPR, and may not be included in an essential element.

In the transmitter, the S/P converter 407 converts the scrambled signal, the DFT unit 409 performs DFT, the IFFT unit 411 performs IFFT, and the CP adder 413 adds a CP and transmits a signal to a demodulation apparatus (hereinafter, a receiver) that receives the signal through a channel 415.

With such operations of the transmitter, the PAPR of the transmission signal is maintained similarly with a case using the QAM scheme.

The receiver according to an embodiment of the present disclosure may include at least one of a synchronization and CP removal unit 431, an FFT unit 433, an IDFT unit 435, a P/S converter 437, a descrambler 439, a correlator 441, a log likelihood ratio (LLR) calculator 443, and a channel decoder 445. In particular, the descrambler 439, the correlator 441, and the LLR calculator 443 perform main operations according to an embodiment of th present disclosure.

The synchronization and CP removal unit 431 performs synchronization with respect to a received signal and removes a CP from the signal. The FFT unit 433 performs FFT with respect to the C-removed signal, and the IDFT unit 435 performs IDFT with respect to the converted signal. The P/S converter 437 converts the converted signal from a parallel signal to a serial signal.

The descrambler 439 descrambles the converted signal by using a sequence corresponding to a sequence used by the scrambler 405. The descrambling may be performed in the unit of a subcarrier to correspond to the scrambler 405.

Figure 6:
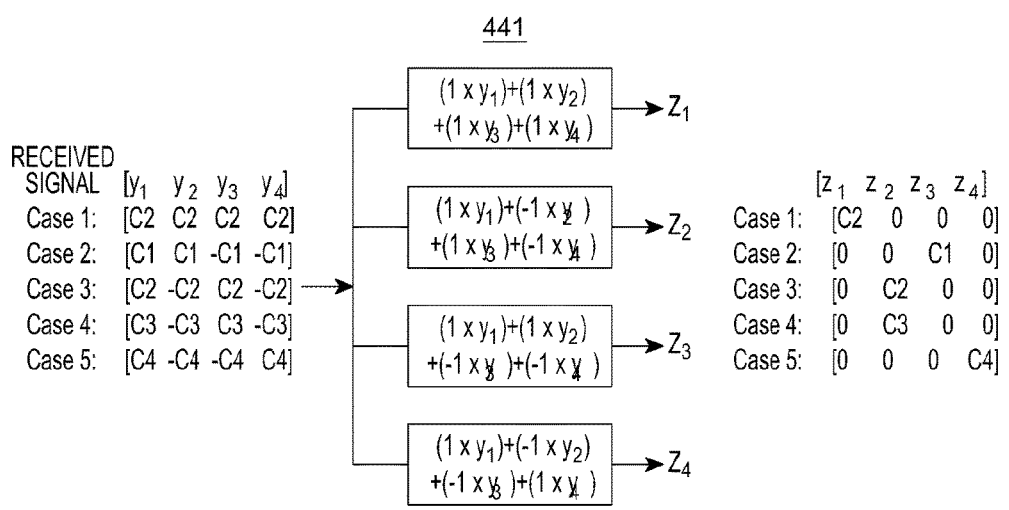
FIG. 6 illustrates an operation of a correlator of a receiver according to an embodiment of the present disclosure.

The correlator 441 extracts sequence information (the sequence information used by the modulator 403) and mapping information included in the descrambled signal based on a correlation corresponding to a predetermined sequence set. That is, the correlator 441 may extract sequence information and mapping information included in a signal received from the transmitter. For each vector output after multiplication by the extracted sequence information as shown in FIG. 6, the correlator 441 uses outputs of other correlators to estimate a parameter such as an SINR, non-Gaussian characteristics, etc., with high accuracy.

The LLR calculator 443 calculates an LLR from the received signal or the converted signal. In particular, the LLR calculator 443 needs to generate a non-Gaussian decoding metric because the correlator 441 forms a non-Gaussian interference channel. A method for generating a complex generalized Gaussian (CGG) decoding metric is a representative method for generating the non-Gaussian decoding metric. The method for generating the CGG decoding metric assumes that an interference signal or noise follows a CGG distribution, calculates an LLR or a probability density function (PDF), and provides the calculated result as an input to the channel decoder 435.

The channel decoder 435 estimates at least one of information bits and a symbol based on the calculated LLR.

An interference signal detected from the received signal based on the foregoing operations of the receiver is made non-Gaussian and uses QAM, thereby improving performance with binary encoding/decoding.

Figure 7:
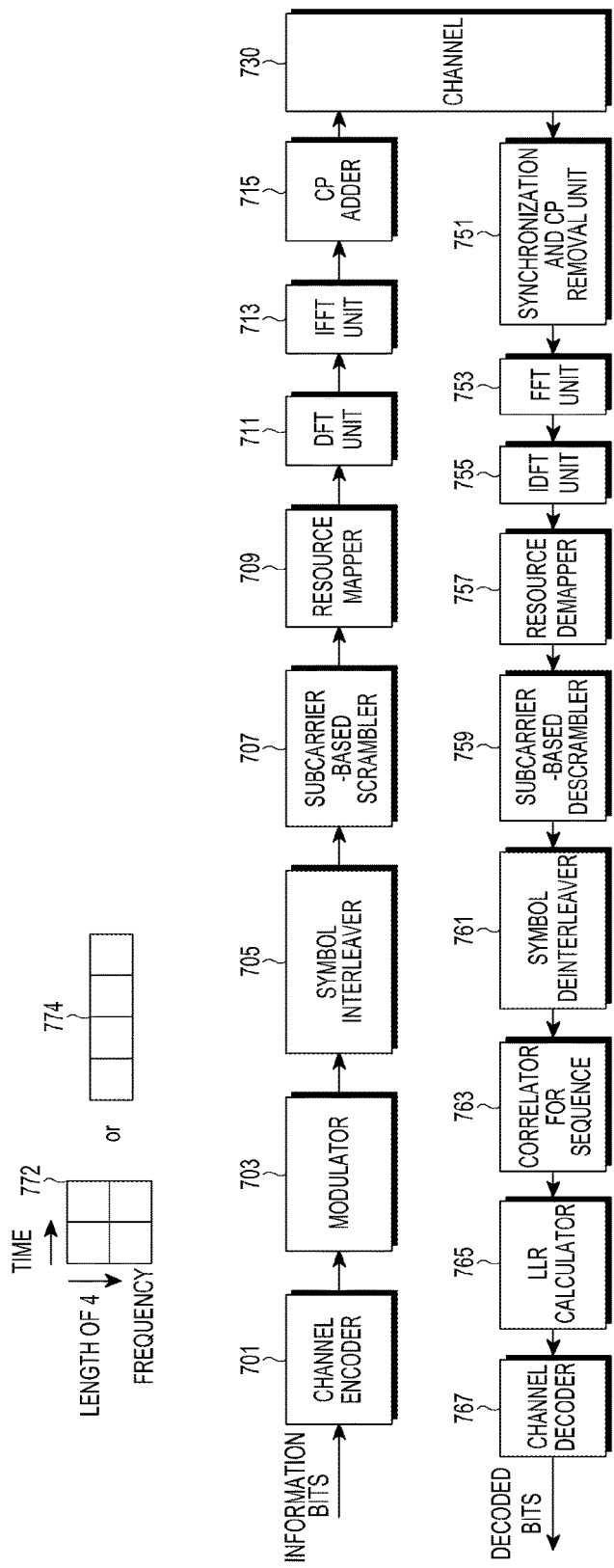
FIG. 7 is a block diagram of a modulation and demodulation apparatus for transmitting and receiving a signal in a wireless communication system according to another embodiment of the present disclosure.

FIG. 7 is a block diagram of a modulation and demodulation apparatus for transmitting and receiving a signal in a wireless communication system according to another embodiment of the present disclosure. The modulation apparatus for transmitting and receiving a signal in a wireless communication system according to another embodiment, illustrated in FIG. 7, operates similarly with the modulation and demodulation apparatus for transmitting and receiving a signal in a wireless communication system according to an embodiment of the present disclosure, illustrated in FIG. 5, except for a different configuration thereof.

Referring to FIG. 7, the transmitter may include at least one of a channel encoder 802, a modulator 703, a symbol interleaver 705, a scrambler 707, a resource mapper 709, a DFT unit 711, an IFFT unit 713, and a CP adder 715. Elements included in the transmitter may not include only essential elements and some of them may be omitted according to an embodiment.

The channel encoder 801 encodes transmission information bits by using a binary code.

The modulator 703 modulates the encoded information bits by using the HQAM scheme. A level of the HQAM scheme used in this case may be determined differently according to an embodiment, and the level may be determined variably according to a channel state. The modulator 703 maps the input encoded information bits to QAM symbols according to a QAM modulation order. Herein, the modulator 703 operates similarly with the modulator 403 described with reference to FIG. 4, and thus will not be described in detail. The modulator 703 according to an embodiment of the present disclosure converts encoded information bits to QAM symbols according to a predetermined QAM modulation order, selects a sequence corresponding to an element of an integer vector in a predetermined sequence set, repeats the converted QAM symbols for a predetermined sequence length, and outputs a signal by multiplying the repeated QAM symbols by the selected sequence.

The symbol interleaver 705 performs symbol interleaving to reduce a channel correlation between output symbols, more specifically, symbol interleaving in the unit of an HQAM symbol.

The scrambler 707 scrambles the output symbols, and in particular, scrambles the output symbol in the unit of a subcarrier in an embodiment of the present disclosure. More specifically, since there may exist a repeated pattern of subcarriers, the scrambler 707 may apply scrambling in the unit of a subcarrier to reduce a pattern repeated for reducing a PAPR. A method for selecting a scrambling sequence in the scrambler 70 may be determined variously according to a transmission signal or symbol, but a scrambling sequence may be identically applied in identical transmitter and receiver and a scrambling sequence may be identically applied for each transmitter.

The resource mapper 709 maps subcarrier resources in such a way that fading effects of subcarriers of the HQAM symbol correspond to one another. The corresponding fading effects include the subcarriers' experiencing similar fading effects, and as such, the transmitter maps the subcarrier resources to allow the subcarriers to experience similar fading effects. In an embodiment of the present disclosure, resource mapping maps a specific resource region on time/frequency and for a length of 4, resource mapping may be performed as indicated by reference numeral 772 or 774.

The DFT unit 711 performs DFT with respect to a signal mapped to a transmission resource, the IFFT unit 713 performs IFFT with respect to the DFT-processed signal, and the CP adder 816 adds a CP to the IFFT-processed signal and transmits the CP-added signal to the receiver through a channel 730.

The receiver according to an embodiment of the present disclosure may include at least one of a synchronization and CP removal unit 751, an FFT unit 753, an IDFT unit 755, a resource demapper 757, a descrambler 759, a symbol deinterleaver 751, a correlator 763, an LLR calculator 765, and a channel decoder 767.

The synchronization and CP removal unit 751 performs synchronization with respect to a received signal and removes a CP from the signal. The FFT unit 753 performs FFT with respect to the CP-removed signal. The IDFT unit 755 performs IDFT with respect to the transformed signal.

The resource demapper 757 demaps a symbol from a resource allocated corresponding to the resource mapper 709.

The descrambler 759 performs descrambling based on the demapped signal by using a sequence corresponding to a sequence used by the scrambler 707. The descrambling may be performed in the unit of a subcarrier to correspond to the scrambler 707.

The symbol interleaver 861 performs symbol deinterleaving in the unit of an HQAM symbol to correspond to the symbol interleaver 705.

The correlator 763 extracts sequence information and mapping information included in the deinterleaved signal based on a correlation corresponding to a predetermined sequence set. Herein, the correlator 763 operates similarly with the modulator 441 described with reference to FIG. 4, and thus will not be described in detail.

The LLR calculator 765 calculates an LLR from the received signal and the extracted sequence information. The channel decoder 767 estimates a symbol based on at least one of the calculated LLR and the received signal information.

Figure 8:
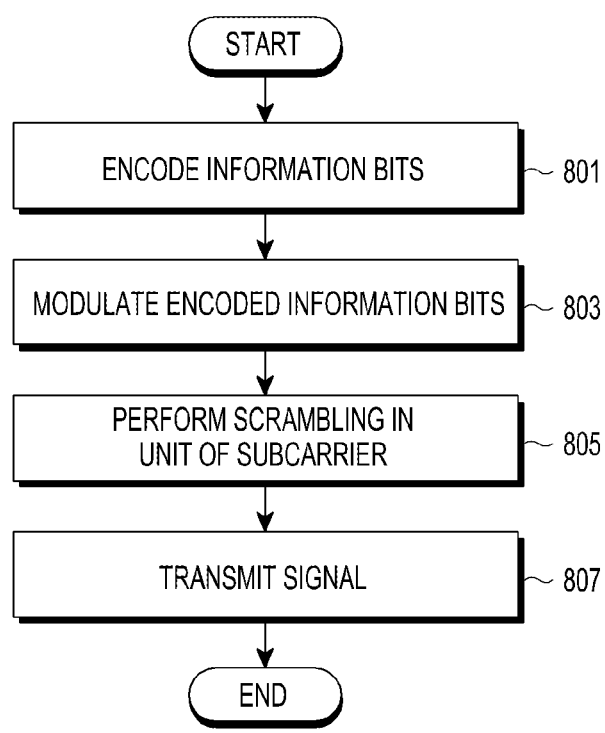
FIG. 8 is a flowchart illustrating a modulation method for transmitting a signal by a transmitter of a wireless communication system according to an embodiment of the present disclosure.

FIG. 8 is a flowchart illustrating a modulation method for transmitting a signal by a transmitter of a wireless communication system according to an embodiment of the present disclosure. In FIG. 8, only main operations of a modulation method, performed by the transmitter, according to an embodiment of the present disclosure are shown.

Referring to FIG. 8, the transmitter encodes transmission information bits by using a binary code in operation 801. The transmitter converts the encoded information bits into QAM symbols according to a predetermined QAM modulation order, selects a sequence corresponding to an element of an integer vector in a predetermined sequence set, repeats the converted QAM symbols for a predetermined sequence length, and outputs a signal by multiplying the repeated QAM symbols by the selected sequence, in operation 803. Herein, the QAM modulation order and the sequence length to be applied are information delivered in advance between the transmitter and the receiver.

The transmitter scrambles the output signal in the unit of a subcarrier in operation 805. Since there may exist a repeated pattern of subcarriers due to a hopped sequence, scrambling may be applied in the unit of a subcarrier to reduce a pattern repeated for reducing a PAPR.

The transmitter performs additional processing for transmitting the scrambled signal and transmits the processed signal to the receiver through a channel in operation 807. Herein, the additional processing means at least one of serial-to-parallel conversion, DFT, IFFT, and CP addition.

Figure 9:
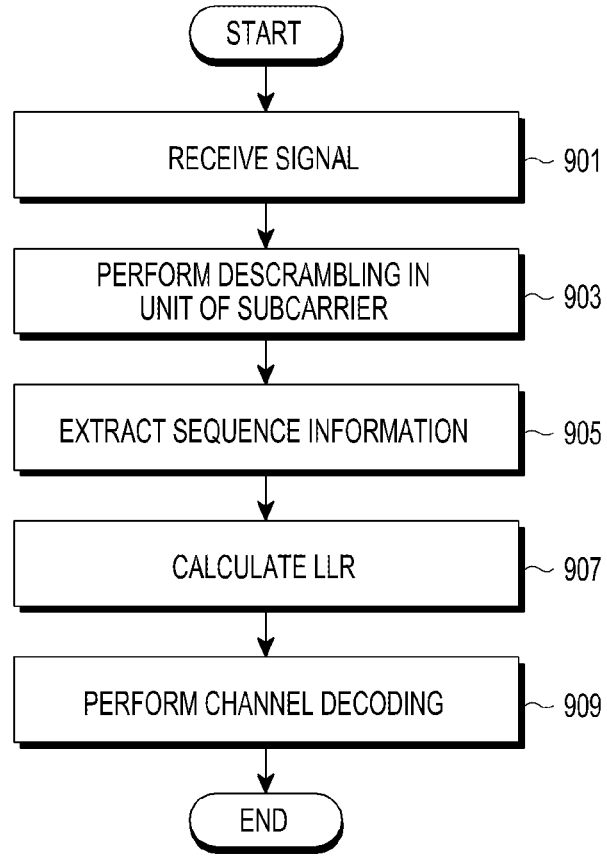
FIG. 9 is a flowchart illustrating a demodulation method for receiving a signal in a receiver of a wireless communication system according to an embodiment of the present disclosure.

FIG. 9 is a flowchart illustrating a modulation method for transmitting a signal by a transmitter of a wireless communication system according to an embodiment of the present disclosure. In FIG. 9, only main operations of a demodulation method, performed by the receiver, according to an embodiment of the present disclosure are shown.

Referring to FIG. 9, the receiver receives a signal from the transmitter in operation 901. Herein, the receiver performs synchronization with respect to the received signal, removes a CP, performs FFT and IDFT with respect to the CP-removed signal, and converts the transformed signal from a parallel signal to a serial signal.

The receiver descrambles a received signal in the unit of a subcarrier by using a sequence corresponding to a sequence used in the scrambling operation of FIG. 8. The receiver extracts sequence information used in the modulation operation of FIG. 8 based on the descrambled signal in operation 905. The receiver calculates an LLR from the received signal and the extracted sequence information in operation 907.

The receiver estimates at least one of information bits and a symbol based on the calculated LLR.

Hereinafter, a description will be made of a method for operating a modulation scheme in which a base station including the transmitter and the receiver and a terminal transmit and receive signals to and from each other.

Figure 10:
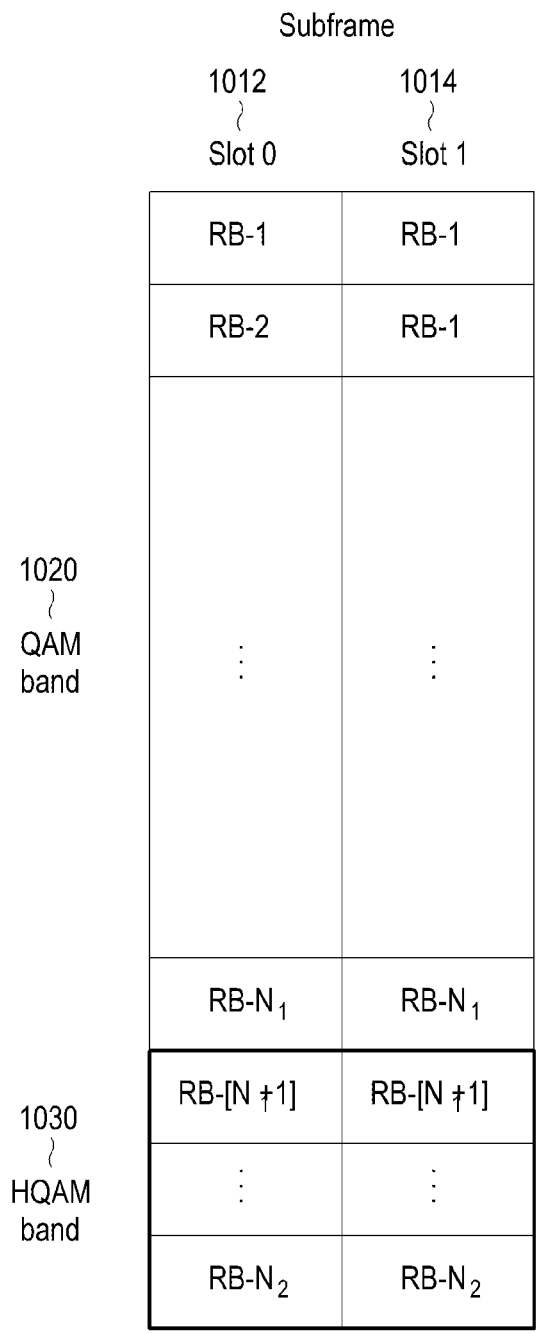
FIG. 10 illustrates a structure of a transmission subframe according to an embodiment of the present disclosure.

FIG. 10 illustrates a structure of a transmission subframe according to an embodiment of the present disclosure.

Referring to FIG. 10, in a wireless communication system according to an embodiment of the present disclosure, a subframe may include a slot 0 1012 and a slot 1 1014 according to a time domain. According to a frequency domain, the subframe may include a QAM band 1020 and an HQAM band 1030. Herein, the HQAM band 1030 may be used like an SQAM band.

The QAM band 1020 may include $N_1$ resource blocks (RBs), and the HQAM band 1030 may include $N_2$ RBs. N1 and N2 may be selected differently according to an embodiment, and may be variably selected according to a channel status.

The signal transmitted in the QAM band 1020 may be modulated and demodulated according to the QAM scheme, and the signal transmitted in the HQAM band 1030 may be modulated and demodulated according to the HQAM scheme.

Figure 11:
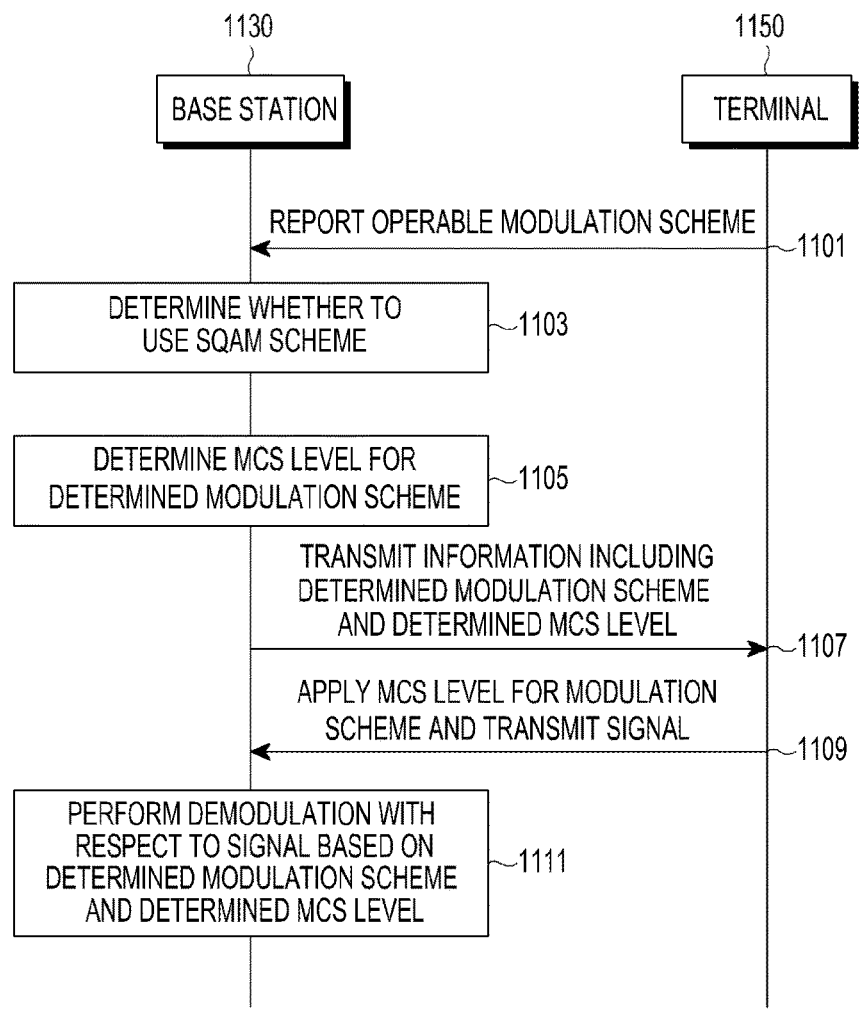
FIG. 11 illustrates an example of a signal transmission/reception method between a base station and a terminal that use a modulation method according to an embodiment of the present disclosure.

FIG. 11 illustrates an example of a signal transmission/reception method between a base station and a terminal that use a modulation method according to an embodiment of the present disclosure.

Referring to FIG. 11, a base station 1130 and a terminal 1150 according to an embodiment of the present disclosure transmit and receive signals to and from each other. A modulation method used in signal transmission/reception according to an embodiment of the present disclosure may be determined variously, but with reference to FIG. 11, the modulation method will be described based on a system operating the SQAM scheme and the HQAM scheme in an uplink.

The terminal 1150 reports an operable modulation scheme between the SQAM scheme and the HQAM scheme to the base station 1130 in operation 1101. That is, the terminal 1150 reports applicability of only the HQAM scheme, applicability of only the SQAM scheme, applicability of both the HQAM scheme and the SQAM scheme, and applicability of none of the HQAM scheme and the SQAM scheme to the base station 1130. The terminal 1150 sends a request message for an applicable modulation and coding scheme (MCS) level to the base station 1130 when transmitting a signal to the base station 1130, and the request message may include at least one of information about the QAM scheme, the HQAM scheme, and the SQAM scheme, a sequence length, and a code rate.

The base station 1130 determines whether to use the SQAM scheme as the modulation scheme in operation 1103. In this case, the SQAM scheme needs non-binary decoding. Thus, the base station 1130 determines whether non-binary decoding is able to be performed based on its current loading situation, and determines to use the SQAM scheme as the modulation scheme if non-binary coding is able to be performed. The loading situation is estimated based on at least one of a processing latency, the number of terminals supported at the same time, and MCS information of each terminal (i.e., non-binary coding or binary coding). For example, if the number of terminals that have to be supported at the same time is greater than a predetermined threshold, the base station 1130 may determine to use the HQAM scheme; if the number of terminals that have to be supported at the same time is less than the predetermined threshold, the base station 1130 may determine to use the SQAM scheme. In another example, if being reported of applicability of only the HQAM scheme as an operable modulation scheme from the terminal 1150, the base station 1130 may determine to use the HQAM scheme. The base station 1130 may determine whether to use the SQAM scheme or the HQAM scheme based on priorities of terminals that have to simultaneously receive a signal. The priorities of the terminals may be determined based on at least one of fairness and overall throughput.

The base station 1130 estimates a channel status of the terminal and determines an MCS level for the determined modulation scheme (i.e., the SQAM scheme or the HQAM scheme) by using the estimated channel status in operation 1105. The terminal's channel status information may include a signal to interference-plus-noise ratio (SINR) of a signal received by the terminal 1150 and a non-Gaussianity of a band where a signal is transmitted using the SQAM scheme or the HQAM scheme. The non-Gaussianity may include a value for determining how much an additive noise distribution deviates from a Gaussian distribution in an α value in a CGG PDF or a corresponding band. The band in which the signal is transmitted using the SQAM scheme or the HQAM scheme may be set between the terminal 1150 and the base station 1130 or may change according to a communication condition. The MCS level may include at least one of a length of a sequence, a QAM level, and a code rate for the SQAM scheme or the HQAM scheme. Herein, a method for determining the MCS level will be described in detail with reference to FIG. 12.

The base station 1130 transmits information including the determined modulation scheme and the determined MCS level to the terminal 1150 in operation 1107.

The terminal 1150 transmits a signal to the base station 1130 by using the MCS level and the modulation scheme included in information received from the base station 1130 in operation 1109. Then, the base station 1130 demodulates the signal received from the terminal 1150 based on the determined MCS level and modulation scheme.

Figure 12:
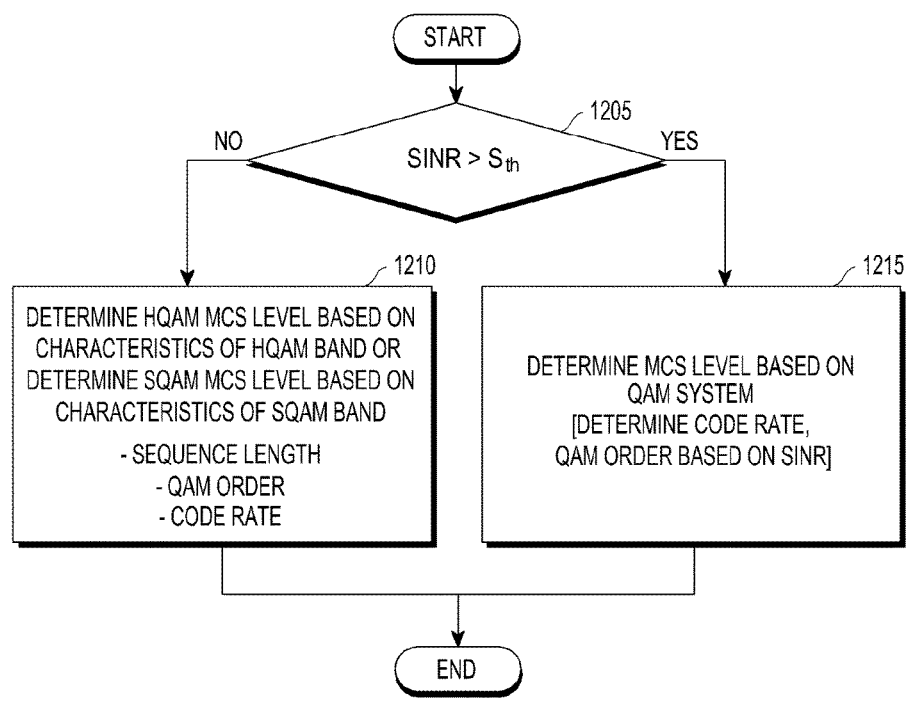
FIG. 12 is a flowchart illustrating a method for determining an MCS level in a modulation method according to an embodiment of the present disclosure.

FIG. 12 is a flowchart illustrating a method for determining an MCS level in a modulation method according to an embodiment of the present disclosure. Referring to FIG. 12, in an embodiment of the present disclosure, it will be described that a base station determines an MCS level, but a terminal may directly determine an MCS level based on an SINR measured by the terminal.

The base station compares an SINR of a signal received by the terminal with a threshold value $S_{th}$ in operation 1205. The threshold value $S_{th}$ may be determined according to a preset value or may be determined variably according to a communication condition. More specifically, the threshold value $S_{th}$ may be determined based on a value that is a criterion for determining whether to perform repetition in the QAM scheme using an MCS of a particular level.

If the SINR is greater than $S_{th}$, the base station determines the MCS level based on the QAM scheme in operation 1210. More specifically, if $S_{th}$ is equal to 3 dB, the base station applies QPSK and a code rate of ½ for SINR>3 dB and transmits a signal.

If the SINR is less than or equal to $S_{th}$, the base station may determine the MCS level of the SQAM scheme or the HQAM scheme based on characteristics of an SQAM band or an HQAM band. The MCS level of the SQAM scheme or the HQAM scheme may include at least one of a length of a sequence, a QAM level/order, and a code rate. A characteristic value determined in the SQAM band or the HQAM band may be determined based on a non-Gaussianity. An MCS level of a communication system may be optimized using link level simulation (LLS).

As channel characteristics of the SQAM band or the HQAM band are similar with Gaussian, a sequence length may be increased and a QAM order may be lowered. As channel characteristics of the SQAM band or the HQAM band are similar with non-Gaussian, a sequence length may be reduced and a QAM order may be increased. The base station may adjust the MCS level of the SQAM scheme or the HQAM scheme merely with one of a sequence length change and a QAM order change according to a channel characteristic change.

As the SINR increases, the sequence length may be reduced and the QAM order may be increased. As the SINR decreases, the sequence length may be increased and the QAM order may be lowered.

Thus, in this way, the base station may determine the MCS level of the QAM scheme, the HQAM scheme, or the SQAM scheme.

Figure 13:
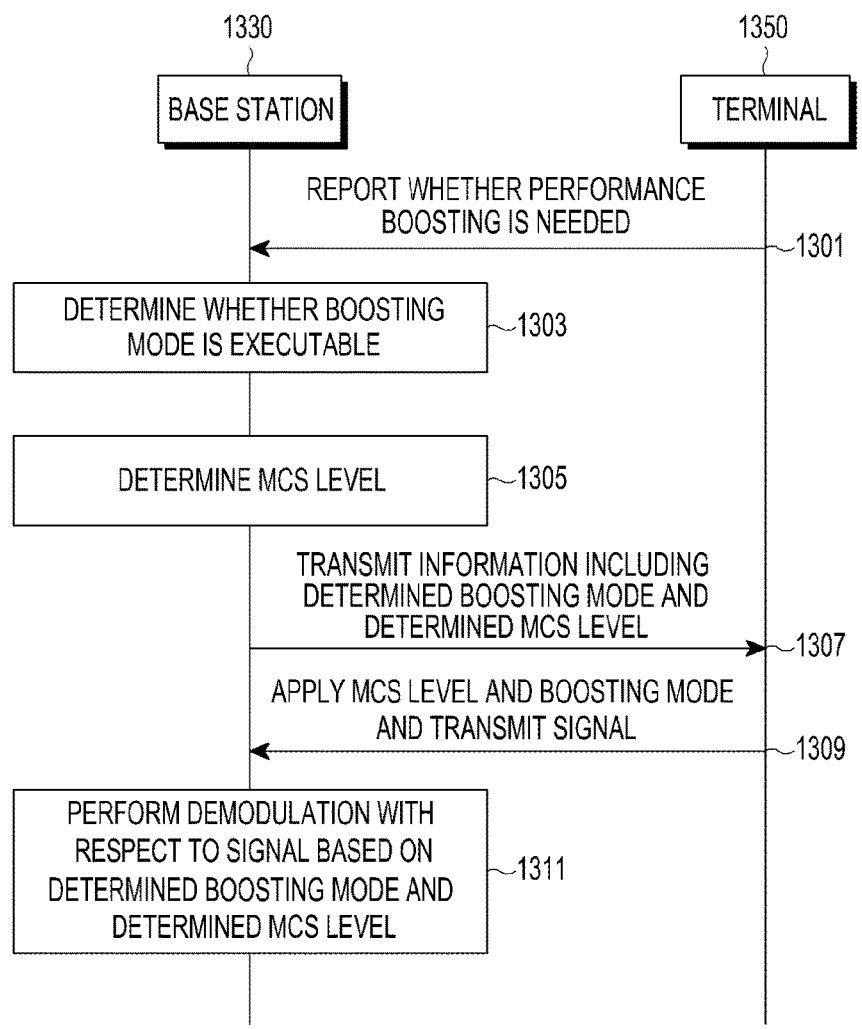
FIG. 13 illustrates another example of a signal transmission/reception method between a base station and a terminal that use a modulation method according to an embodiment of the present disclosure.

FIG. 13 illustrates another example of a signal transmission/reception method between a base station and a terminal that use a modulation method according to an embodiment of the present disclosure.

Referring to FIG. 13, a base station 1330 and a terminal 1350 according to an embodiment of the present disclosure transmit and receive signals to and from each other. A modulation method used in signal transmission/reception according to an embodiment of the present disclosure may be determined variously, but with reference to FIG. 13, the modulation method will be described based on a system where performance boosting is applied in the HQAM scheme in an uplink.

The terminal 1350 reports the base station of whether the terminal 1350 needs performance boosting in operation 1301. In this case, it is assumed that the terminal 1350 does not support the SQAM scheme and needs performance boosting. A situation where the terminal 1350 needs performance boosting may correspond to a case where a cell-edge terminal is in an emergency situation (e.g., an emergency call mode) or fails in data retransmission a predetermined number of times or more. The terminal 1150 sends a request message for an applicable MCS level to the base station 1130 when transmitting a signal to the base station 1130, and the request message may include at least one of information about the QAM scheme or the HQAM scheme, a sequence length, and a code rate.

The base station 1330 determines based on a current loading situation whether a boosting mode is applicable in communication with the terminal 1350 in operation 1303. That is, the base station 1330 determines one of a first mode, which is a normal mode, and a second mode, which is the boosting mode, based on the current loading situation. In the first mode, a correlator agreed to receive data receives data, estimates an interference signal by performing hard decision (HD), and estimates non-Gaussian characteristics by using the estimated interference signal. In the second mode, a correlator for a sequence operates at all times, and non-Gaussian characteristics and an SINR are estimated by using outputs of correlators other than a correlator agreed to receive data. In the first mode, performance degrades in spite of a reduced complexity in comparison to the second mode, whereas in the second mode, a complexity increases in spite of performance improvement. In the second mode, high-accuracy AMC may be performed due to improvement of the accuracy of estimation of non-Gaussian characteristics.

The base station 1330 determines a channel status of the terminal and determines an MCS level applicable to the terminal 1150 by using the determined channel status in operation 1305. The terminal's channel status information may include an SINR of a signal received by the terminal 1150 and a non-Gaussianity of a band where a signal is transmitted using the HQAM scheme. The band in which the signal is transmitted using the HQAM scheme may be set between the terminal 1350 and the base station 1330 or may change according to a communication condition. The MCS level may include at least one of a length of a sequence, a QAM level, and a code rate for the HQAM scheme. Herein, the method for determining the MCS level has already been described in detail with reference to FIG. 12, and thus will not be described in detail at this time. When the MCS level is determined, the base station 1330 may apply a separate MCS table according to whether the boosting mode is applied or not.

The base station 1330 transmits information including the determined boosting mode and the determined MCS level to the terminal 1350 in operation 1307.

The terminal 1350 transmits to the base station 1330, a signal to which the MCS level and the boosting mode included in information received from the base station 1330 is applied, in operation 1309. Then, the base station 1330 demodulates the signal received from the terminal 1350 based on the determined MCS level and boosting mode in operation 1311.

Figure 14:
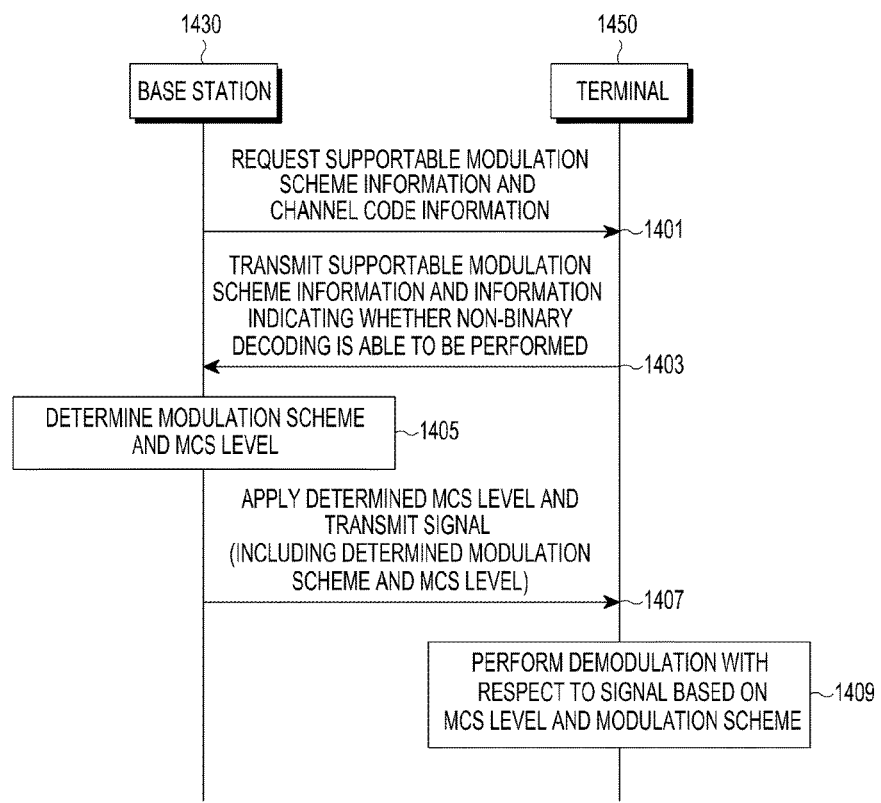
FIG. 14 illustrates an example of a signal transmission/reception method between a base station and a terminal that use a modulation method according to an embodiment of the present disclosure.

FIG. 14 illustrates an example of a signal transmission/reception method between a base station and a terminal that use a modulation method according to an embodiment of the present disclosure.

Referring to FIG. 14, a base station 1430 and a terminal 1450 according to an embodiment of the present disclosure transmit and receive signals to and from each other. A modulation method used in signal transmission/reception according to an embodiment of the present disclosure may be determined variously, but with reference to FIG. 14, the modulation method will be described based on a system operating the SQAM scheme and the HQAM scheme or the FQAM scheme and the NQAM scheme in a downlink.

The base station 1430 sends a request for information about a supportable modulation scheme and channel code information to the terminal 1450 in operation 1401. That is, the base station 1430 sends a request for information about one supportable modulation scheme between the SQAM scheme and the HQAM scheme and information indicating whether non-binary decoding is able to be performed to the terminal 1450.

The terminal 1450 estimates the information requested by the base station 1430 and reports the base station 1430 of the estimated information in operation 1403. That is, the terminal 1450 reports the base station 1430 of the information about one supportable modulation scheme between the SQAM scheme and the HQAM scheme and the information indicating whether non-binary decoding is able to be performed. In this case, the terminal 1450 may report the base station 1430 of one of applicability of only the HQAM scheme, applicability of only the SQAM scheme, applicability of both the HQAM scheme and the SQAM scheme, and applicability of none of the HQAM scheme and the SQAM scheme as the information about one supportable modulation scheme between the SQAM scheme and the HQAM scheme. The terminal 1450 may determine based on a remaining battery capacity thereof whether non-binary decoding is able to be performed, and report the base station 1430 of a determination result. For example, if the remaining battery capacity is greater than a predetermined threshold value, the terminal 1450 may determine that non-binary coding is able to be performed and report the base station 1430 of the determination result. The terminal 1450 reports the base station 1430 of an SINR of an allocated resource region and a non-Gaussianity of an HQAM region together. The non-Gaussianity may include a value for determining how much an additive noise distribution deviates from a Gaussian distribution in an α value in a CGG PDF or a corresponding band.

The base station 1430 determines the SQAM scheme or the HQAM scheme of the terminal 1450 by using the information reported from the terminal 1450, and determines an MCS level for a modulation scheme of the terminal 1450 by using the SINR and the non-Gaussianity in operation 1405. That is, the base station 1430 determines the MCS level for the modulation scheme of the terminal 1450 by performing AMC using an MCS table suitable for the determined modulation scheme (the SQAM scheme or the HQAM scheme).

The base station 1430 applies the determined modulation scheme and MCS level and transmits a signal to the terminal 1450, and at the same time, transmits information about the MCS level and modulation scheme (the SQAM scheme or the HQAM scheme) applied to the transmitted signal, to the terminal 1450 in operation 1407.

Then, the terminal 1450 demodulates the received signal by using the information about the MCS level and the modulation scheme, received from the base station 1430, in operation 1409.

Figure 15:
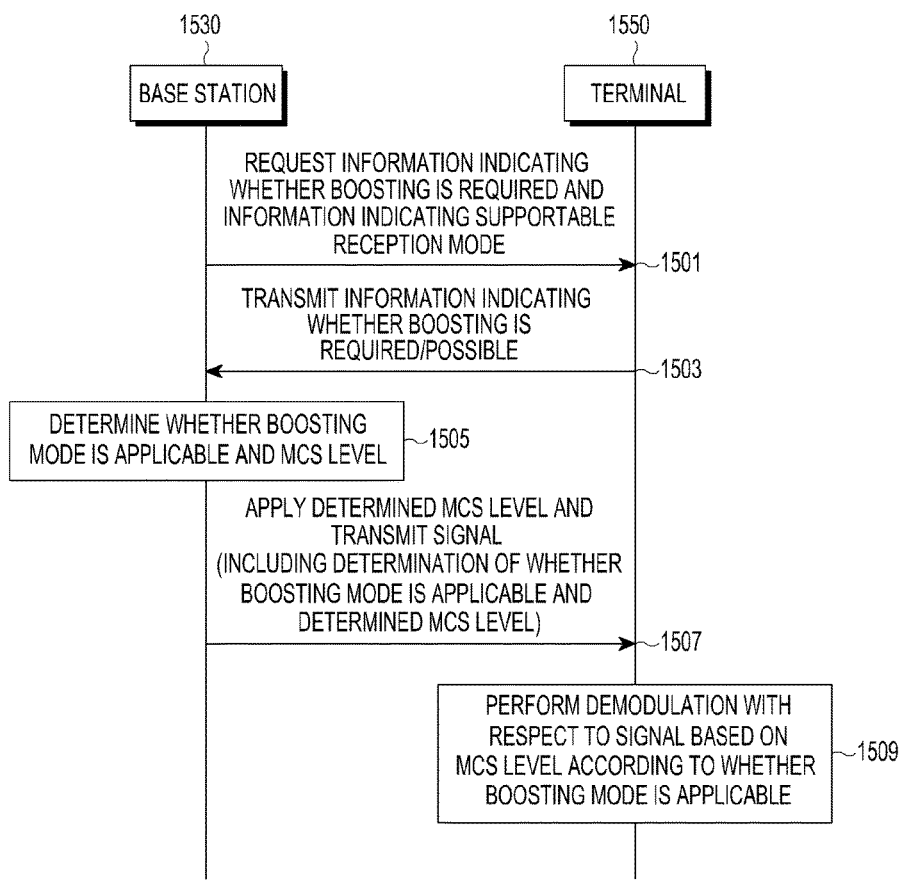
FIG. 15 illustrates another example of a signal transmission/reception method between a base station and a terminal that use a modulation method according to an embodiment of the present disclosure.

FIG. 15 illustrates another example of a signal transmission/reception method between a base station and a terminal that use a modulation method according to an embodiment of the present disclosure.

Referring to FIG. 15, a base station 1530 and a terminal 1550 according to an embodiment of the present disclosure transmit and receive signals to and from each other. A modulation method used in signal transmission/reception according to an embodiment of the present disclosure may be determined variously, but with reference to FIG. 15, the modulation method will be described based on a system where performance boosting is applied in the HQAM scheme or the SQAM scheme in a downlink.

The base station 1530 sends a request for information indicating whether boosting is required, information indicating a supportable reception mode, and channel status information to the terminal 1550 in operation 1501. Herein, the information indicating the supportable reception mode is information indicating whether the boosting mode is executable, and indicates the first mode or the second mode described with reference to FIG. 13. The channel status information includes an SINR of an allocated resource region and non-Gaussian information of the HQAM region.

The terminal 1550 estimates the information requested by the base station 1530 and reports the base station 1530 of the estimated information in operation 1503. That is, the terminal 1550 reports the base station 1530 of the information indicating the supportable reception mode based on the channel status information, the information whether boosting is required, and a remaining battery capacity. A situation where the terminal 1550 needs boosting may correspond to a case where a cell-edge terminal is in an emergency situation (e.g., an emergency call mode) or fails in data retransmission a predetermined number of times or more. In the following description, it is assumed that the terminal 1550 needs boosting and reports the base station 1530 of information indicating the second mode (the boosting mode).

The base station 1530 determines based on the information reported from the terminal 1550 whether the boosting mode is applicable in communication with the terminal 1550, and determines an MCS level suitable for the terminal 1550, in operation 1505. The base station 1530 may determine the MCS level of the terminal 1550 by using a separate MCS table according to whether the boosting mode is applicable.

If the boosting mode is applicable, the base station 1550 applies the boosting mode and the determined MCS level to a signal and transmits the signal to the terminal 1550, and transmits to the terminal 1550, information about the MCS level and the boosting mode which are applied to the transmitted signal, in operation 1507.

Then, the terminal 1550 demodulates the received signal by using the information about the MCS level and the modulation scheme, received from the base station 1530, in operation 1509.

Figure 16:
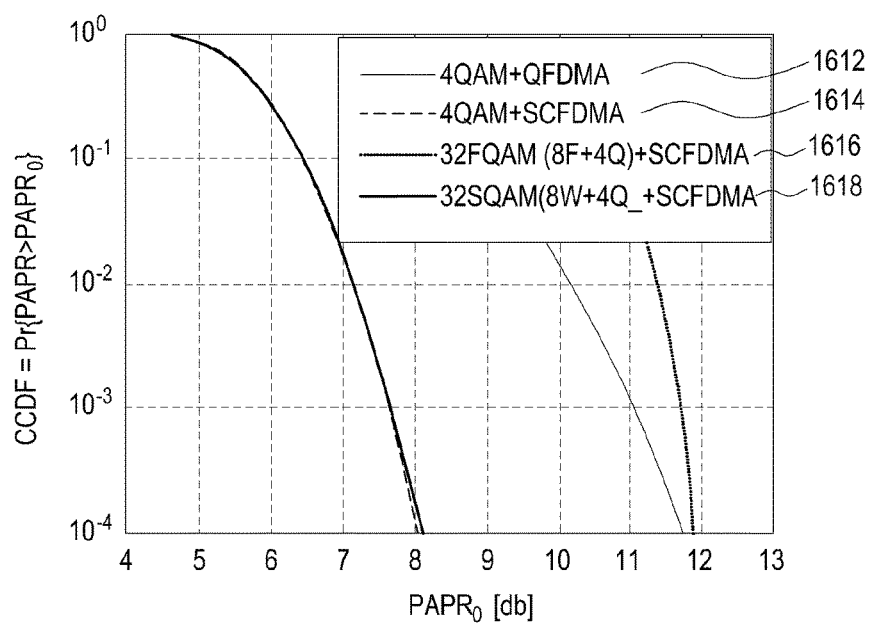
FIG. 16 shows a PAPR distribution in a wireless communication system according to an embodiment of the present disclosure.

FIG. 16 shows a PAPR distribution in a wireless communication system according to an embodiment of the present disclosure.

Referring to FIG. 16, reference numeral 1612 indicates a graph showing a PAPR change when 4-QAM is used in an OFDMA system. Reference numeral 1614 indicates a graph showing a PAPR change when 4-QAM is used in an SC-FDMA system. Reference numeral 1616 indicates a graph showing a PAPR change when 32-FQAM (4-FSK+ 8-QAM) is used in an SC-FDMA system. Reference numeral 1618 indicates a graph showing a PAPR change when 32-SQAM (4-WSM+8-QAM) is used in an SC-FDMA system. Referring to the illustrated graphs, when the FQAM scheme is used in the SC-FDMA system, a PAPR is increased by about 3.8 dB in comparison to the QAM scheme, and when the SQAM scheme is applied in the SC-FDMA system, a PAPR that is similar with the QAM scheme may be obtained.

The HQAM scheme according to an embodiment of the present disclosure has a PAPR that is similar with the SQAM scheme. That is, the HQAM scheme and the SQAM scheme have almost identical waveforms from a statistical point of view, and a PAPR is a result calculated in statistical terms such that the HQAM scheme and the SQAM scheme also have almost similar PAPRs.

While embodiments of the present disclosure have been described, various changes may be made without departing the scope of the present disclosure. Therefore, the scope of the present disclosure should be defined by the appended claims and equivalents thereof, rather than by the described embodiments.

The invention claimed is:

1. A modulation method in a transmitter that transmits a signal in a wireless communication system, the modulation method comprising:
   determining a modulation scheme;
   converting encoded information bits to quadrature amplitude modulation (QAM) symbols according to a predetermined QAM modulation order if the determined modulation scheme corresponds to a particular modulation scheme;
   selecting a sequence corresponding to an element of an integer vector in a predetermined sequence set, repeating the QAM symbols for a predetermined sequence length;
   outputting a signal by multiplying the repeated QAM symbols by the selected sequence; and
   transmitting the output signal to a receiver.

2. The modulation method of claim 1, further comprising scrambling the output signal in a unit of a subcarrier, after outputting the signal.

3. The modulation method of claim 1, wherein the determining of the modulation scheme comprises:
   receiving at least one of information about a channel status, information about an operable modulation scheme, or information about a supportable channel code from the receiver; and
   determining the modulation scheme based on the received information about the operable modulation scheme and information about the supportable channel code.

4. The modulation method of claim 3, further comprising applying a modulation and coding scheme (MCS) level determined based on the information about the channel status and transmitting the output signal to the receiver, and at a same time, transmitting the determined modulation scheme and the determined MCS level to the receiver.

5. The modulation method of claim 1, wherein the determining of the modulation scheme comprises:
   receiving at least one of information about a channel status or information about performance boosting from the receiver; and
   determining the modulation scheme and whether a performance boosting mode is applicable in the particular modulation scheme, based on the information about the performance boosting.

6. The modulation method of claim 5, wherein the information about the performance boosting comprises information indicating whether the receiver needs to perform the performance boosting in the particular modulation scheme and information indicating whether the performance boosting mode is executable in the receiver.

7. The modulation method of claim 5, further comprising applying an MCS level determined based on the information about the channel status and transmitting the output signal to the receiver, and at a same time, transmitting the determined MCS level and the determination of whether the performance boosting mode is applicable in the particular modulation scheme to the receiver.

8. A demodulation method in a receiver that receives a signal in a wireless communication system, the demodulation method comprising:
   receiving a signal from a transmitter;
   extracting sequence information corresponding to the received signal from a sequence set based on a correlation corresponding to the sequence set, predetermined in the transmitter; and
   demodulating the received signal based on the received signal and a log likelihood ratio (LLR) calculation result corresponding to the sequence information,
   wherein the received signal is a signal obtained by converting encoded information bits into quadrature amplitude modulation (QAM) symbols according to a predetermined QAM modulation order, selecting a sequence corresponding to an element of an integer vector in a predetermined sequence set, repeating the QAM symbols for a predetermined sequence length, and outputting a signal by multiplying the repeated QAM symbols by the selected sequence.

9. The demodulation method of claim 8, further comprising scrambling the received signal in a unit of a subcarrier, after receiving the signal.

10. The demodulation method of claim 8, further comprising transmitting at least one of information about a channel status, information about an operable modulation scheme, and information about a supportable channel code to the transmitter.

11. The demodulation method of claim 10, further comprising receiving a signal from the transmitter, and at a same time, receiving a modulation scheme and a modulation and coding scheme (MCS) level, which are applied to the received signal, from the transmitter,
   wherein the received modulation scheme and MCS level are used during the demodulation.

12. The demodulation method of claim 8, further comprising transmitting at least one of information about a channel status or information about performance boosting to the transmitter.

13. The demodulation method of claim 12, wherein the information about the performance boosting comprises information indicating whether the receiver needs to perform the performance boosting in a particular modulation scheme and information indicating whether the performance boosting mode is executable in the receiver.

14. The demodulation method of claim 13, further comprising receiving a signal from the transmitter, and at a same time, receiving an MCS level applied to the received signal and information about whether the performance boosting mode is applied in the particular modulation scheme, from the transmitter,
   wherein the received MCS level and the received information about whether the performance boosting mode is applied in the particular modulation scheme are used during the demodulation.

15. An apparatus that modulates and transmits a signal in a wireless communication system, the apparatus comprising:
   a modulator configured to determine a modulation scheme, to convert encoded information bits to quadrature amplitude modulation (QAM) symbols according to a predetermined QAM modulation order if the determined modulation scheme corresponds to a particular modulation scheme, to select a sequence corresponding to an element of an integer vector in a predetermined sequence set, to repeat the QAM symbols for a predetermined sequence length, and to output a signal by multiplying the repeated QAM symbols by the selected sequence; and
   a transmitter configured to transmit the output signal to a receiver.

16. The apparatus of claim 15, further comprising a scrambler configured to scramble the output signal in a unit of a subcarrier.

17. The apparatus of claim 15, wherein the modulator is further configured to, upon receiving at least one of information about a channel status, information about an operable modulation scheme, or information about a supportable channel code from the receiver, determine the modulation scheme based on the received information about the operable modulation scheme and information about the supportable channel code.

18. The apparatus of claim 17, wherein the transmitter is further configured to apply a modulation and coding scheme (MCS) level determined based on the information about the channel status and transmit the output signal to the receiver, and at a same time, transmit the determined modulation scheme and the determined MCS level to the receiver.

19. The apparatus of claim 15, wherein the modulator is further configured to, upon receiving at least one of information about a channel status or information about performance boosting from the receiver, determine the modulation scheme and whether a performance boosting mode is applicable in the particular modulation scheme, based on the information about the performance boosting.

20. The apparatus of claim 19, wherein the information about the performance boosting comprises information indicating whether the receiver needs to perform the performance boosting in the particular modulation scheme and information indicating whether the performance boosting mode is executable in the receiver.

21. The apparatus of claim 19, wherein the transmitter is further configured to apply an MCS level determined based on the information about the channel status and transmit the output signal to the receiver, and at a same time, transmit the determined MCS level and the determination of whether the performance boosting mode is applicable in the particular modulation scheme to the receiver.

22. A apparatus that receives and demodulates a signal in a wireless communication system, the apparatus comprising:
a receiver configured to receive a signal from a transmitter;
a correlator configured to extract sequence information corresponding to the received signal from a sequence set based on a correlation corresponding to the sequence set, predetermined in the transmitter; and
a demodulator configured to demodulate the received signal based on the received signal and a log likelihood ratio (LLR) calculation result corresponding to the sequence information,
wherein the received signal is a signal obtained by converting encoded information bits into quadrature amplitude modulation (QAM) symbols according to a predetermined QAM modulation order, selecting a sequence corresponding to an element of an integer vector in a predetermined sequence set, repeating the QAM symbols for a predetermined sequence length, and outputting a signal by multiplying the repeated QAM symbols by the selected sequence.

23. The apparatus of claim 22, further comprising a descrambler configured to descramble the received signal in a unit of a subcarrier.

24. The apparatus of claim 22, further comprising a transmitter configured to transmit at least one of information about a channel status, information about an operable modulation scheme, or information about a supportable channel code to the transmitter.

25. The apparatus of claim 22, wherein the receiver is further configured to receive a signal from the transmitter, and at a same time, receive a modulation scheme and a modulation and coding scheme (MCS) level, which are applied to the received signal, from the transmitter.

26. The apparatus of claim 25, wherein the demodulator is further configured to demodulate the received signal by using the received modulation scheme and MCS level.

27. The apparatus of claim 22, further comprising a transmitter configured to transmit at least one of information about a channel status or information about performance boosting to the transmitter.

28. The apparatus of claim 27, wherein the information about the performance boosting comprises information indicating whether the receiver needs to perform the performance boosting in a particular modulation scheme and information indicating whether the performance boosting mode is executable in the receiver.

29. The apparatus of claim 28, wherein the receiver is further configured to receive a signal from the transmitter, and at a same time, receive an MCS level applied to the received signal and information about whether the performance boosting mode is applied in the particular modulation scheme, from the transmitter.

30. The apparatus of claim 29, wherein the demodulator is further configured to demodulate the received signal by using the received MCS level and the received information about whether the performance boosting mode is applied in the particular modulation scheme.

* * * * *